United States Patent [19]

Sano

[11] Patent Number: 4,621,823
[45] Date of Patent: Nov. 11, 1986

[54] STEERING SYSTEM FOR VEHICLES

[75] Inventor: Shoichi Sano, Tokyo, Japan

[73] Assignee: Honda Giken Kogyo Kabushiki Kaisha, Tokyo, Japan

[21] Appl. No.: 661,679

[22] Filed: Oct. 17, 1984

[30] Foreign Application Priority Data

Oct. 17, 1983 [JP] Japan .................... 58-193670

[51] Int. Cl.⁴ ............................................. B62D 7/00
[52] U.S. Cl. ........................................ 280/91; 280/96
[58] Field of Search ................... 280/91, 96, 707; 180/140, 141, 142; 74/571 L, 831, 834, 836

[56] References Cited

U.S. PATENT DOCUMENTS 3,933,215  1/1976  Scheuerle .................. 180/140
4,313,514  2/1982  Furukawa et al. .......... 280/91
4,335,800  6/1982  Arato ........................ 280/91

FOREIGN PATENT DOCUMENTS 26363  2/1984  Japan .

Primary Examiner—John J. Love
Assistant Examiner—Ross Weaver
Attorney, Agent, or Firm—Irving M. Weiner; Joseph P. Carrier; Pamela S. Burt

[57] ABSTRACT

A steering system for vehicles, in which the steered angle ratio of a rear wheel (20) to a front wheel (7) is controlled to be variable in accordance with the vehicle speed.

The steered angle ratio is set stepwise with respect to the vehicle speed.

9 Claims, 11 Drawing Figures

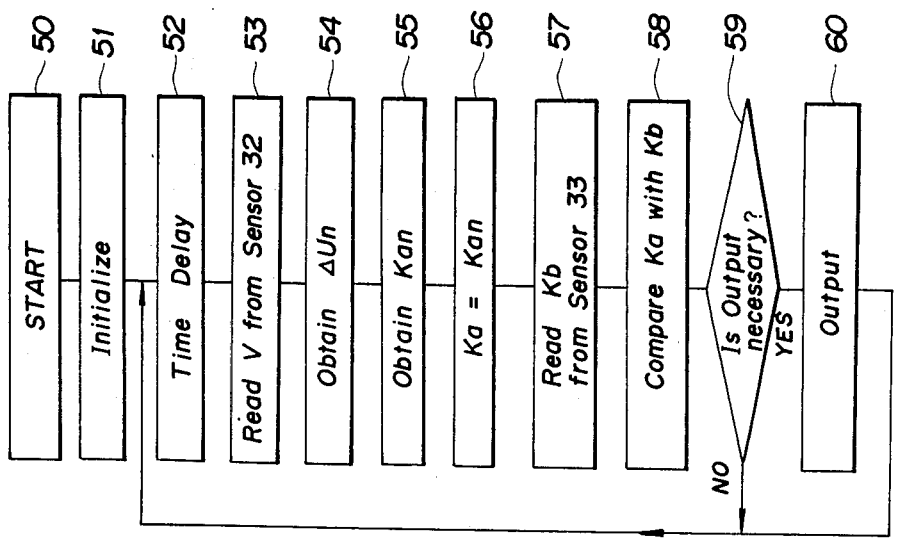
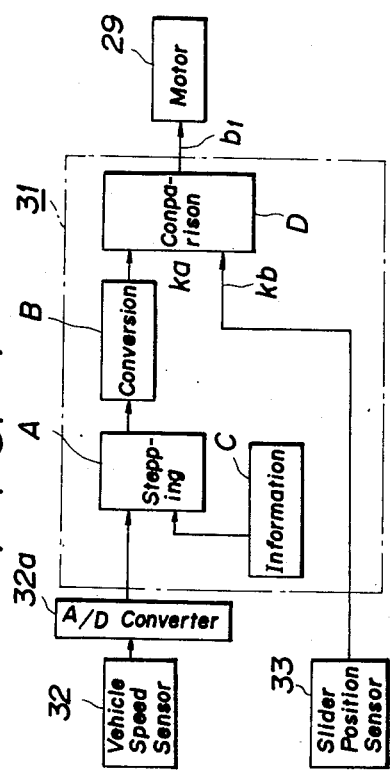
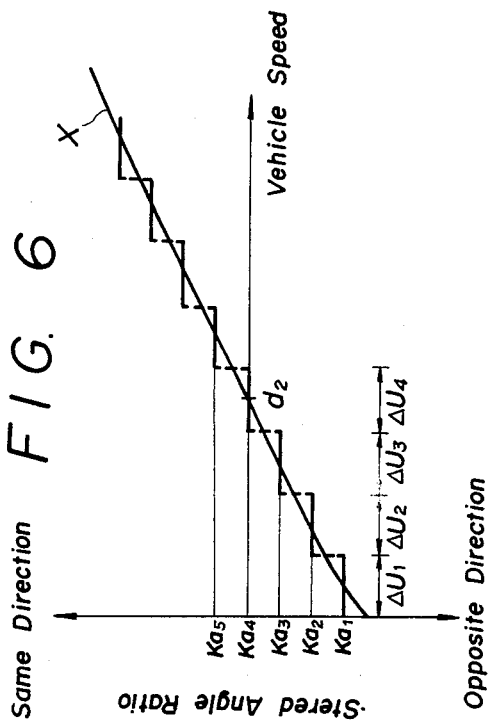

STEERING SYSTEM FOR VEHICLES

BACKGROUND OF THE INVENTION

1. Field of the Invention

The present invention relates to a steering system for vehicles, and particularly, to a steering system for vehicles of the type in which a rear wheel is steerable in relation to the steering operation of a front wheel.

2. Description of Relevant Art

The present applicant has already proposed a steering system for vehicles in which a rear wheel is steerable in relation to the steering of a front wheel, such that the steered angle ratio of the rear wheel to the front wheel is variable in accordance with the vehicle speed. (Japanese Laid Open Application No. JP-A-59-26363 dated Feb. 10, 1984).

More particularly, in this steering system, the rear wheel is steered, at relatively low vehicle speeds, in the opposite direction to the front wheel or substantially at an angle of zero degree and, at relatively high vehicle speeds, in the same direction as the front wheel. The steered angle ratio is given as a continuous function of the vehicle speed, as represented by a curve X of FIG. 6, such that for vehicle speeds higher relative to a predetermined vehicle speed $d_2$ the angle ratio is positive, that is, the steered angles of the front and rear wheels are the same in phase, and for vehicle speeds lower relative thereto the angle ratio is negative, that is, the steered angles are opposite in phase. Thus, a continuous control of the steered angle ratio is achieved to be effected along the function curve X, ranging from a low speed to a high speed. As a result, at relatively low vehicle speeds, the minimum turning radius of the vehicle as well as the inside wheel span is remarkably reduced, and in addition the vehicle turning characteristic such as when parking, travelling along a narrow curved road, or making a U-turn, is favorably facilitated. Moreover, at relatively high vehicle speeds, the steering responsiveness can be highly improved.

Incidentally, in such steering system, the control of the steered angle ratio is effected to be continuously variable by means such as of an electric motor controlled with a computer mounted on the vehicle, so that the motor or the like is put in service each time the vehicle speed changes even in the case of a slight change, thus resulting in a relatively larger power consumption. Moreover, such frequent service may result in deterioration in the endurance of a rear wheel steering mechanism which is generally designed sound enough to endure relatively large stresses imposed thereon in its motion corresponding to the variation of the steered angle ratio.

With such points in mind, the present invention has been achieved to provide an improvement in a steering system for vehicles of the above-mentioned type.

SUMMARY OF THE INVENTION

According to the present invention, there is provided a steering system for vehicles in which a rear wheel is steered in relation to the steering of a front wheel, and the steered angle ratio of the rear wheel to the front wheel is controlled to be variable in correspondence to the vehicle speed, comprising an interval setting means for setting by dividing the vehicle speed into a plurality of speed intervals, and a ratio setting means for setting for each of the speed intervals a single steered angle ratio, for thereby setting the steered angle ratio to be controlled in a variable stepwise manner with respect to the vehicle speed.

Moreover, according to the present invention, there is provided a steering system for vehicles including a steering wheel, a front wheel, a means for steering the front wheel, a rear wheel, a means for steering the rear wheel, a ratio changing means for changing the steered angle ratio of the rear wheel to the front wheel, a control means for controlling the ratio changing means, and a speed detecting means for detecting the vehicle speed, the speed detecting means cooperating with the control means. The rear wheel is steered at relatively low vehicle speeds in the opposite direction to the front wheel or substantially at an angle of zero degree and at relatively high vehicle speeds in the same direction as the front wheel, wherein the steered angle ratio is set stepwise with respect to the vehicle speed.

Accordingly, an object of the present invention is to provide a steering system for vehicles which permits the working time thereof for variable control of the steered angle ratio to be remarkably decreased, thereby achieving a minimized power consumption and an improved endurance, as well as facilitations in the detection of vehicle speed and the signal processing procedure, thus contributing to the simplification of the system and increasing reliability.

The above and further features, objects and advantages of the present invention will become apparent from the following detailed description of the preferred embodiment of the invention when the same is read in conjunction with the accompanying drawings.

BRIEF DESCRIPTION OF THE DRAWINGS

FIG. 4 is a functional block diagram of a control part of the steering system of FIG. 1.

FIG. 5 is a schematic flowchart of a program for a microcomputer system of the control part of FIG. 4.

FIG. 6 is a graph showing a characteristic curve of the steered angle ratio of the steering system of FIG. 1.

DETAILED DESCRIPTION OF THE PREFERRED EMBODIMENT

Figure 1:
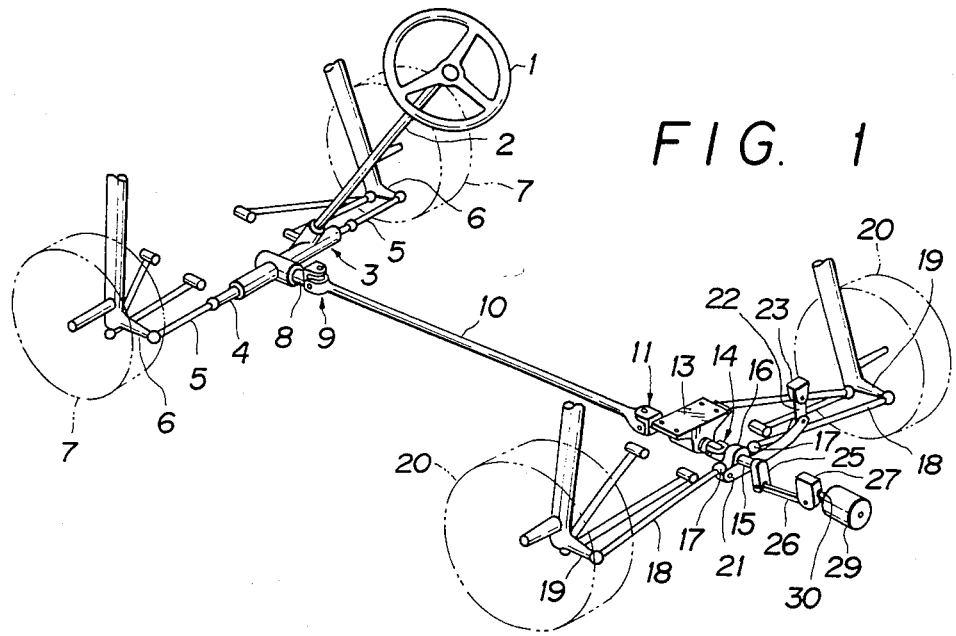
FIG. 1 is a schematic perspective view showing a basic structure of a vehicle equipped with a steering system according to the preferred embodiment of the present invention.
Figure 2:
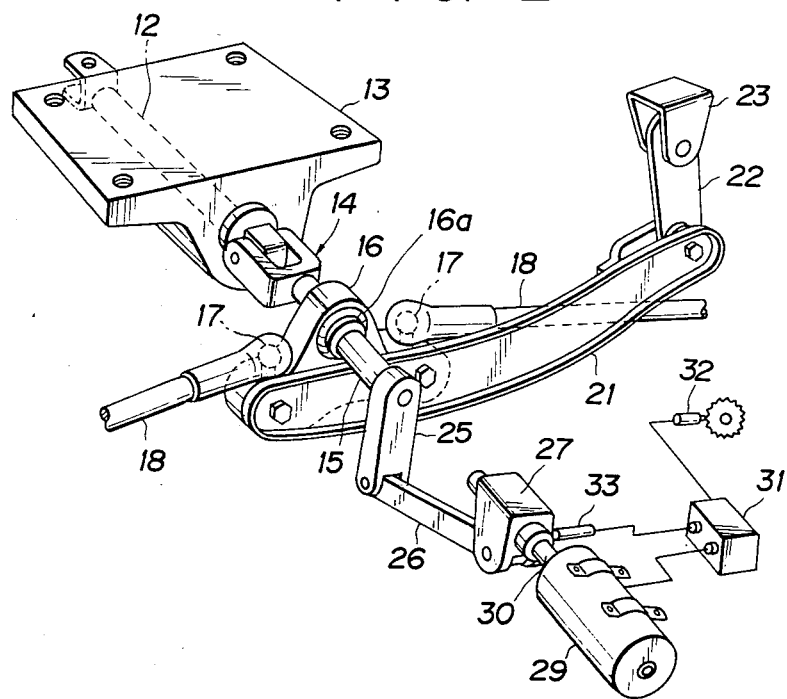
FIG. 2 is an enlarged perspective view of a rear wheel steering mechanism of the steering system of FIG. 1.

There will be described hereinbelow a steering system for vehicles according to the preferred embodiment of the invention, which includes a basic steering system substantially equivalent to that of the known steering system outlined hereinabove. FIGS. 1 and 2 show the arrangement of the basic steering system, the function of which will be described in detail hereinbelow in conjunction with FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering mechanism is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering mechanism, the input shaft extending along the longitudinal centerline of a vehicle body (not shown) and being rotatably supported by means of a bearing bracket 13 secured to the vehicle body. The rear end of the input shaft is connected through a bifurcate joint 14 to a swingable shaft 15 having at the longitudinally middle part thereof a joint member 16 loose fitted thereon. The joint member 16 is connected at each transverse end thereof through one of a pair of ball joints 17, 17 to the inner end of one of a pair of tie rods 18, 18, while being transversely and vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. To the lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the above-mentioned input shaft, which is designated at reference numeral 12 in FIG. 2.

Moreover, the vehicle has mounted thereon a microcomputer 31 receiving a vehicle speed signal from a vehicle speed sensor 32 detecting the vehicle speed and a steered angle ratio signal from a slider position sensor 33 detecting the screw-fed position of the slider 27. The computer 31 is adapted to supply a later-described command signal to the motor 29 in accordance with the vehicle speed.

In the above arrangement, a mechanism for changing the steered angle ratio of the rear wheels 20, 20 to the front wheels 7, 7 is constituted by the swingable shaft 15, the joint member 16, the arm member 25, the link 26, the slider 27, the motor 29, and the output shaft 30.

Figure 3A:
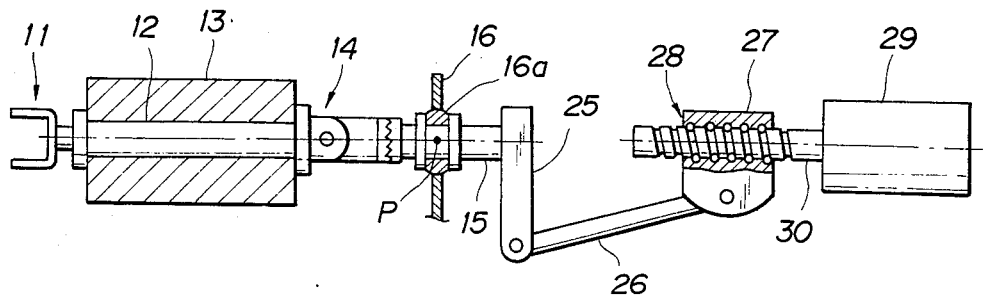
FIGS. 3a to 3c are longitudinal sectional side views, for functional explanation, of an essential part of the rear wheel steering mechanism of FIG. 2.
Figure 3B:
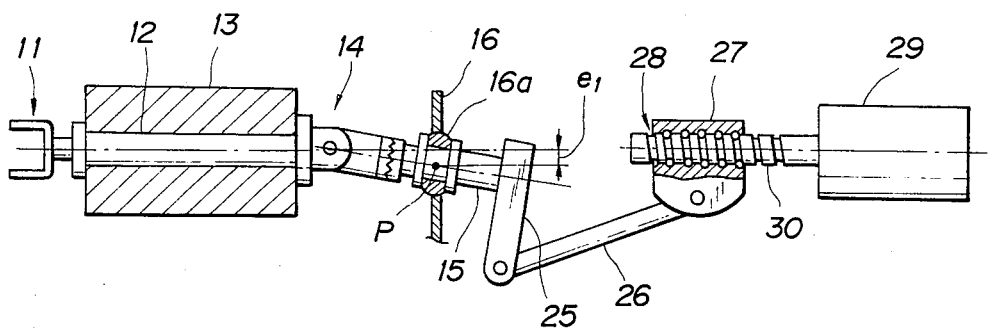
Figure 3C:
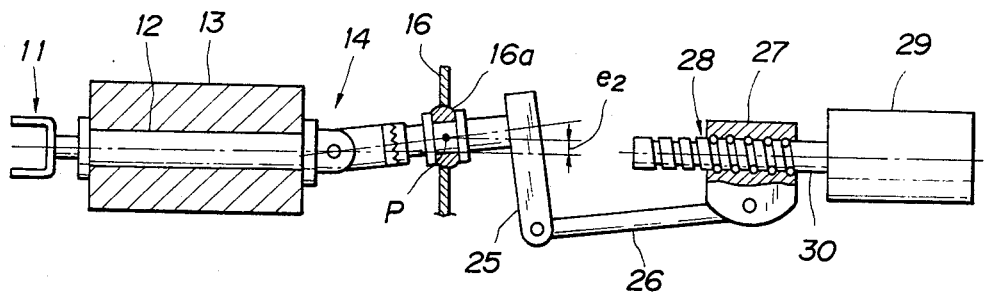

Referring now to FIGS. 3a to 3c, the steered angle ratio changing mechanism will be described below with respect to the function thereof.

When the vehicle speed is within a speed interval $\Delta U_4$ described later with reference to FIG. 6, the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that, even in the case where the swingable shaft 15 is rotated, the joint member 16 will not laterally swing, thus being kept from actuating the left and right rear tie rods 18, 18. Accordingly, when operated, the steering wheel 1 will steer only the front wheels 7, 7, leaving the rear wheels 20, 20 substantially unsteered.

On the other hand, when the vehicle has a relatively low speed not reaching the speed interval $\Delta U_4$, the computer 31 receiving the vehicle speed signal from the vehicle speed sensor 32 makes a judgment, which causes the motor 29 to be controlled in the number of revolutions thereof in response to the detected vehicle speed, whereby the slider 27 is advanced as shown in FIG. 3b from the position thereof in FIG. 3a. At such a relatively low speed, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which varies stepwise depending on the vehicle speed.

To the contrary, when the vehicle has a relatively high speed exceeding the speed interval $\Delta U_4$, the computer 31 causes the motor 29 to be reversed in accordance with the speed the vehicle then has, so that the slider 27 is retreated as shown in FIG. 3c from the position thereof in FIG. 3a. At such a relatively high speed, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also varies stepwise depending on the vehicle speed.

Incidentally, the computer 31 comprises a microcomputer system including, but not limited to, a plurality of integrated circuits (not shown) such as a CPU, a ROM, a RAM, and a plurality of peripheral interfaces.

There will be described hereinbelow the essential arrangement as well as the function of a control part of the steering system according to the preferred embodiment, with reference to FIGS. 4 to 6.

Referring now to FIG. 4, the computer 31 has input thereto the vehicle speed signal from the vehicle speed sensor 32 through an A-D converter 32a interposed therebetween, which converter 32a is adapted to convert an analog signal proportional to the vehicle speed, i.e., an output signal of the sensor 32, into a digital signal corresponding thereto, i.e., the vehicle speed signal input to the computer 31. In the computer 31, the vehicle speed signal is processed by way of a stepping A to obtain a speed interval signal to be subjected to a conversion B, the speed interval signal representing a particular one of a plurality of speed intervals ΔUn (where "n" is an arbitrary element of a set of interval suffix numbers, FIG. 6) predetermined to be stored as a data C by stepwise dividing a speed range at an even interval, which particular one is selected in the stepping A so as to cover an actual vehicle speed represented by the vehicle speed signal. The number of speed intervals as well as the extent of speed range is voluntarily but properly determined in consideration of practical use and the like. As will be easily understood, the speed interval signal remains unchanged while the vehicle speed is kept within a particular speed interval, and becomes changed only when it goes beyond either limit of this interval. From the conversion B, there is given a reference steered angle ratio Kan (where "n" represents an arbitrary suffix number of the reference ratio Ka, FIG. 6) corresponding to a particular speed interval ΔUn obtained by the stepping A.

On the other hand, the computer 31 has directly input thereto from the slider position sensor 33 the steered angle ratio signal which represents an actual steered angle ratio kb in terms of a particular position the slider 27 then has. By way of a comparison D of the actual ratio Kb with the reference ratio Ka, the steered angle ratio signal is processed to determine the degree necessary for correction of the steered angle ratio. Then, information on the necessary correction is given in the form of a correction command signal $b_1$ to the control motor 29, to thereby correct the steered angle ratio in accordance with the vehicle speed.

As will be understood from the foregoing description, in the steering system according to the preferred embodiment, a vehicle speed range is equidivided into a plurality of speed intervals to be stored in a memory of a microcomputer, the program of which is thus favorably permitted to include a procedure for obtaining to set a stepwise variable reference value of the steered angle ratio in correspondence to the inherently continuous vehicle speed as detected by a vehicle speed sensor followed by an A-D converter. In this respect, such a procedure may be covered with a simple additional program written in a memory of a conventional vehicle-mounted microcomputer.

FIG. 5 is a flowchart showing a control program stored in the ROM as a memory of the microcomputer system governing the above-described processes in the computer 31.

As seen from FIG. 5, the control program starts at a stage 50 when the control part of the steering system is powered on or reset, and goes to an initializing stage 51 for initializing peripheral devices to set necessary variables.

Thereafter, the program flow enters a base loop comprising a plurality of stages 52 to 60.

At the first stage 52 of the base loop, the flow elapses a time period of approx. 500 milliseconds, before reading at a stage 53 a vehicle speed V from the vehicle speed sensor 32 through the A-D converter 32a. At a subsequent stage 54, a speed interval ΔUn covering the vehicle speed V is obtained and, at a stage 55 next thereto, a steered angle ratio Kan is obtained in correspondence to the speed interval ΔUn, which ratio Kan is substituted for the reference ratio Ka at a stage 56.

At a subsequent stage 57, an actual reference ratio Kb representing the actual position of the slider 27 is read from the slider position sensor 33, which actual ratio Kb is compared with the reference ratio Ka at a stage 58. The result of this comparison is interrogated to judge at a subsequent decision stage 59 whether or not the output of a correction command signal $b_1$ to the control motor 29 is necessary. When judged necessary, the command signal $b_1$ is output to the control motor 29 at the last stage 60 of the base loop, to thereby correct the position of the slider 27, letting the actual steered angle ratio be Ka. In the case where such an output to the motor 29 is judged unnecessary at the decision stage 59, the program flow goes to the above-mentioned mentioned stage 52, as well as when the process at the last stage 60 is completed.

Figure 8:
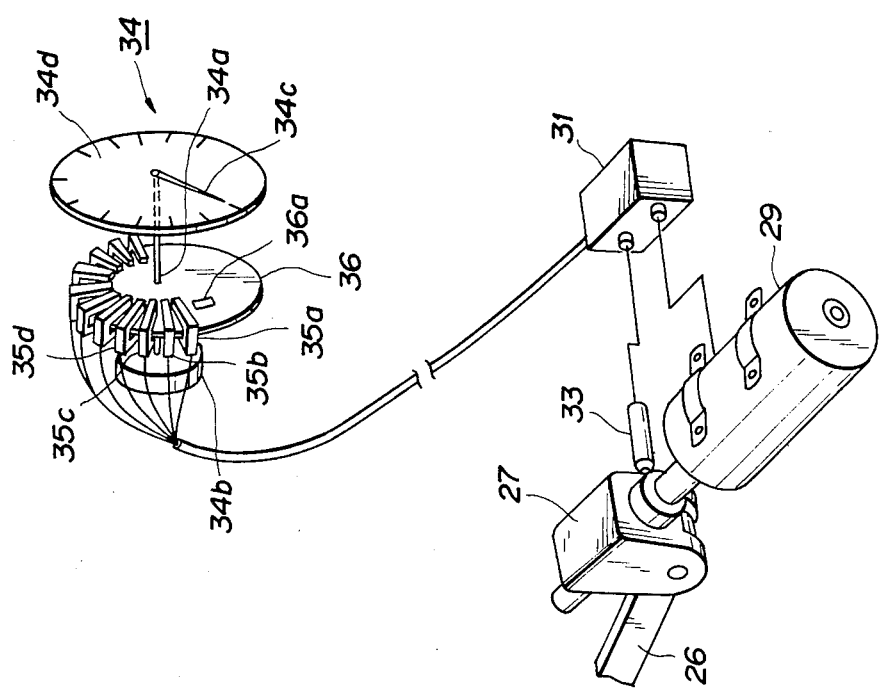
FIG. 8 is a functional block diagram of the control part of FIG. 7.
Figure 7:
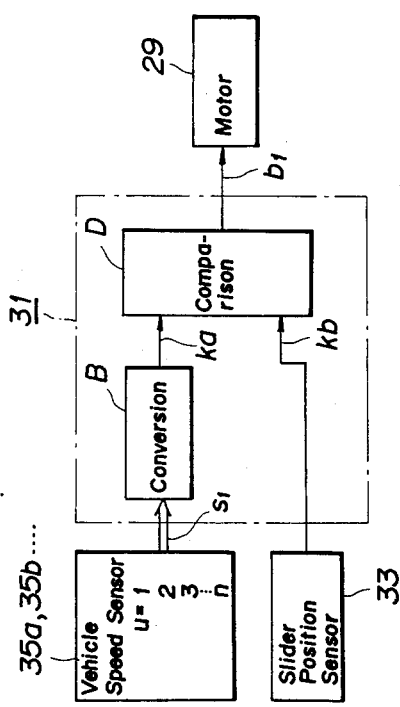
FIG. 7 is a constitutional illustration of a control part of a steering system according to a modified example of the preferred embodiment of the invention.
Figure 9:
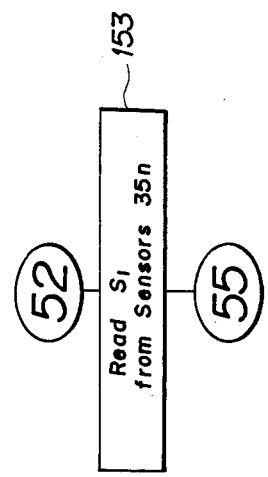
FIG. 9 is a schematic flowchart of an essential part of a program for a microcomputer system of the control part of FIG. 8.

There will be described hereinbelow the arrangement and function of a control part of a steering system for vehicles according to a modified example of the preferred embodiment of the invention, with reference to FIGS. 7 to 9, in which for the convenience of comprehension like parts are designated by like reference characters in relation to the preferred embodiment.

In the steering system according to the modified example, there is employed a vehicle-mounted rotary speedometer 34 with a plurality of speed-interval sensors 35i (where "i" is an arbitrary element of a set of suffix characters "a", "b", "c", "d", ···) for optically detecting the position of a meter pointer 34c in terms of an equidivided speed-interval on an indication disc 34d, instead of the vehicle speed sensor 32 combined with a programmed process for converting the vehicle speed signal therefrom into a corresponding speed interval by way of the stepping A on the basis of data D in the before-described embodiment.

The speedometer 34, which includes a pointer shaft 34a, a drive 34b for driving the shaft 34a, the pointer 34c, and the indication disc, has a rotary disc 36 integrally fitted on the pointer shaft 34a, which disc 36 has axially opened therethrough an arcuately elongated hole 36a functioning as an optical switching element of the speed-interval sensors 35i. The speed-interval sensors 35i, each of which comprises a light projector such as a light-emitting diode to be disposed on either side of the rotary disc 36 and a light receiver such as a photo-diode to be disposed on the other side thereof, are arranged one by one to be loose-fitted radially on the rotary disc 36 in an equi-angularly spaced manner, so that each sensor 35i is adapted to provide a detection signal S1 only while the elongated hole 36a, which is interlocked with the pointer 34c, is passing by the corresponding light receiver. As a result, the detection signal S1 constitutes a stepwise variable function of the vehicle speed, similar to the speed interval signal obtained by the stepping A of FIG. 4 in the preferred embodiment, thus being favorably processable in a computer 31 in a manner similar to that of FIG. 4, as shown by a functional block diagram in FIG. 7.

The above and further processes of the computer 31 are exercised by following a control program stored in a ROM as a memory of the computer 31. The flow of this control program is substantially similar to that of the preferred embodiment, subject to a difference described below. In other words, in the modified example, instead of the stages 53, 54 of FIG. 5, a stage 153 shown in FIG. 9 is inserted between stages 52 and 55. At the stage 153, the detection signal S1 representing a speed interval ΔUn is read from one of the speed-interval sensors 35i in correspondence to the vehicle speed.

As will be understood from the foregoing description, in a steering system for vehicles according to the invention, the steered angle ratio of a rear wheel to a front wheel is controlled to be variable stepwise with respect to the vehicle speed, so that the working time for variable control of the steered angle can be remarkably decreased as a whole, thereby achieving a minimized power consumption such as for an electric motor and an improved mechanical endurance of the system.

Incidentally, in the steering system for vehicles according to the preferred embodiment of the invention, there is employed a microcomputer mounted in the vehicle. In this respect, in place of the computer, there may be employed an electric circuit having a compatible function.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. A steering system for vehicles, in which:
   a rear wheel is steered in relation to the steering of a front wheel; and
   the steered angle ratio of said rear wheel to said front wheel is controlled to be variable in correspondence to the vehicle speed,
   comprising:
   interval setting means for setting by dividing the vehicle speed into a plurality of speed intervals; and
   ratio setting means for setting for each of said speed intervals a single steered angle ratio, for thereby setting the steered angle ratio to be controlled stepwise variable with respect to the vehicle speed.

2. A steering system according to claim 1, wherein:
   said interval setting means comprises a computer program.

3. A steering system according to claim 1, wherein:
   said interval setting means comprises a plurality of speed-interval sensors for detecting the position of a pointer of a rotary speedometer.

4. A steering system for vehicles, including:
   a steering wheel;
   a front wheel;
   means for steering said front wheel;
   a rear wheel;
   means for steering said rear wheel;
   ratio changing means for changing the steered angle ratio of said rear wheel to said front wheel;
   control means for controlling said ratio changing means;
   speed detecting means for detecting the vehicle speed; and
   said speed detecting means cooperating with said control means,
   in which:
   said rear wheel is not steered at a predetermined, intermediate vehicle speed range, is steered in the opposite direction to said front wheel at vehicle speeds below said predetermined range, and is steered in the same direction as said front wheel at vehicle speeds above said predetermined range,
   wherein:
   the steered angle ratio is set stepwise with respect to the vehicle speed.

5. A steering system according to claim 4, wherein:
   said control means comprises a microcomputer system;
   said speed detecting means comprises a speed sensor for substantially continuously detecting the vehicle speed;
   the range of vehicle speed is divided into a plurality of speed intervals; and
   said set steered angle ratio is provided for said speed intervals in a one-to-one correspondence manner.

6. A steering system according to claim 5, wherein:
   said speed intervals are respectively equi-divided with respect to the rest thereof.

7. A steering system according to claim 4, wherein:
   said control means comprises a microcomputer system;
   said speed detecting means comprises a plurality of speed interval sensors for detecting the position of a pointer of a rotary speedometer;
   said speed interval sensors are each respectively adapted for providing a detection signal; and
   said set steered angle ratio is provided for said detection signal of each said speed interval sensor in a one-to-one correspondence manner.

8. A steering system according to claim 7, wherein:
   said speed interval sensors are adapted for detecting the position of said pointer of said rotary speedometer by an even angular interval.

9. A steering system according to claim 1, wherein:
   said ratio setting means includes a ratio detecting means for detecting the current steered angle ratio.

* * * * *

UNITED STATES PATENT AND TRADEMARK OFFICE
CERTIFICATE OF CORRECTION

PATENT NO. : 4,621,823
DATED : November 11, 1986
INVENTOR(S) : Shoichi SANO

It is certified that error appears in the above-identified patent and that said Letters Patent are hereby corrected as shown below:

Column 1, line 47, change "larger" to --large--.
Column 6, lines 12-13, delete "mentioned".
Claim 6, line 2, (column 8, line 32), after "are" insert --each--.

Signed and Sealed this

Twenty-first Day of April, 1987

Attest:

DONALD J. QUIGG

Attesting Officer     Commissioner of Patents and Trademarks